R. A. SMITH.

Brick-Machines.

No. 5,390. Reissued April 29, 1873.

Witnesses.

S. W. Piper

L. N. Müller.

Robert A. Smith.

by his attorney.

R. H. Eddy

AM. PHOTO-LITHOGRAPHIC CO. N.Y. (OSBORNE'S PROCESS.)

UNITED STATES PATENT OFFICE.

ROBERT A. SMITH, OF NEWBURYPORT, MASSACHUSETTS.

IMPROVEMENT IN BRICK-MACHINES.

Specification forming part of Letters Patent No. 128,822, dated July 9, 1872; reissue No. 5,390, dated April 29, 1873; application filed March 29, 1873.

*To all whom it may concern:*

Be it known that I, ROBERT A. SMITH, of Newburyport, of the county of Essex and State of Massachusetts, have invented an Improved Brick-Making Machine; and do hereby declare the same to be fully described in the following specification and represented in the accompanying drawing, of which—

Figure 1:
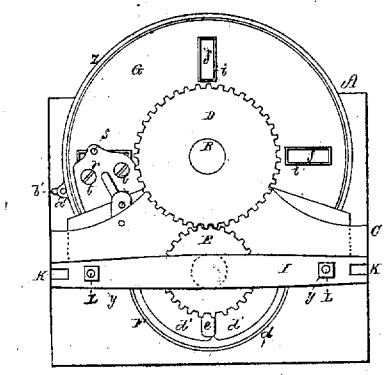
Figure 2:
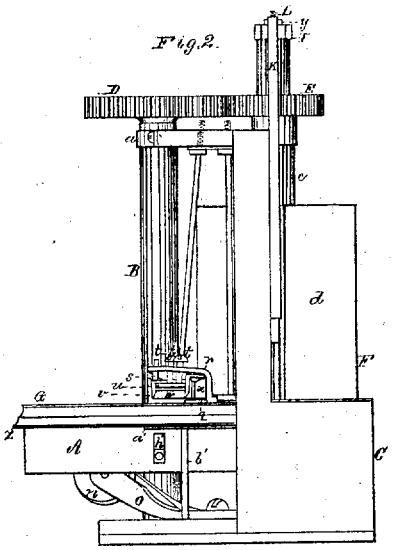
Figure 3:
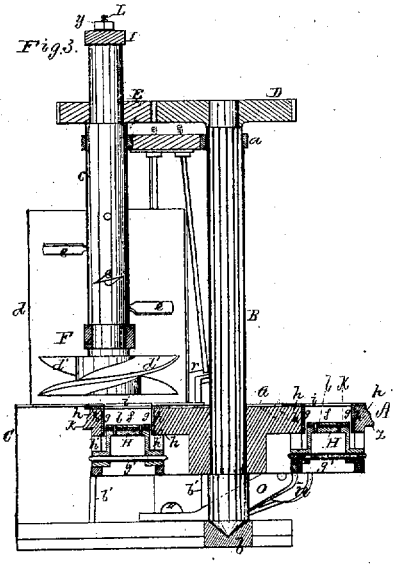
Figure 4:
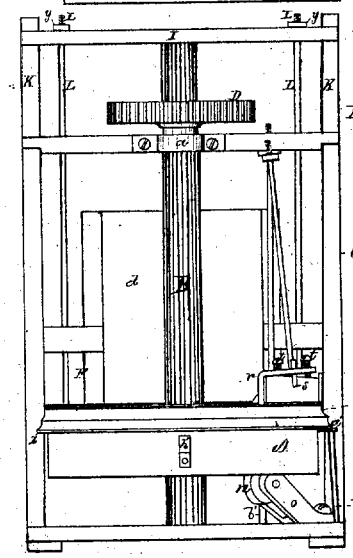
Figure 5:
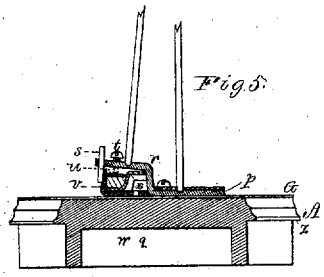

Figure 1 is a top view; Fig. 2, a side elevation; Fig. 3, a front elevation, and Fig. 4, a vertical and transverse section of it. Fig. 5 is a vertical section taken through the main and auxiliary "cut-off" and the discharging-throat of the said auxiliary cut-off.

The nature of my invention may be said to consist as follows, viz: In certain adjusting mechanism, as described, combined and arranged with the pug-mill and its supporting-frame; also, in the mold-wheel, as provided with a steel face-plate, and with one or more chambers for receiving Babbitt metal to constitute the matrix or matrices for the formation of bricks; also, in an auxiliary cut-off and its discharge-throat arranged and combined with the main cut-off, the pug-mill, and the rotary mold-wheel, all substantially as hereinafter explained; also, in a pressure spring and screws combined with the auxiliary cut-off, or such and the main cut-off applied to the mold-wheel, as shown; also, in the follower or brick discharger of each mold as pivoted at its lower part, and having the pivots or their supports arranged in vertical guide-grooves in the mold-wheel; also, the follower, as provided with an anti-friction plate, or one of Babbitt metal, and a cap-plate, all being as hereinafter described; also, the combination and arrangement of a supporting abutment, *a'*, with the mold-wheel, provided with an encompassing shoulder or flange, *z*, to rest on such abutment.

In such drawing, A denotes a mold-wheel applied to a vertical shaft, B, arranged in bearings *a b* in a frame, C, and provided at its upper end with a spur-gear, D. The said gear engages with another such gear, E, fixed upon the shaft *c* of a pug-mill, F, composed of a cylindrical receiver, *d*, said shaft *c* and helical wings *d' d'*, and stirrers or arms *e e*, arranged as in other brick-machines. The pug-mill is placed directly over the rear part of the mold-wheel, and opens at bottom thereon in order that the clay from the receiver, when the brick-machine may be in operation, may flow or be forced directly from the pug-mill into each of the molds in succession. There is to be made in the mold-wheel a series of molds or matrices, one of which is shown at *f*, it being open at top. Each matrix is formed of Babbitt metal, *g*, cast into a chamber, *h*, made in the mold-wheel and around a suitable former placed centrally therein, the matrix at its mouth or upper part being completed by a rectangular slot, *i*, made in a steel cap-plate, G, fixed to the top of the mold-wheel, the said mold-wheel being of cast-iron. Within each mold there is to be a follower or brick-discharger, H, which, at its lower part, is pivoted to a bar or carrier, *g'*, arranged to slide on vertical slots or guides *h' h'* disposed in the mold-wheel. The follower H is thus free to vibrate at top so as to accommodate itself to the mold while rising therein, and in the top of the follower is a packing-plate, *k*, of Babbitt metal, covered and held down by a a cap-plate, *l*, of hard metal, which should be fastened down to the follower. The edges of the Babbitt packing-plate are to be in close contact with the inner vertical surfaces of the matrix, the follower and cap-plate fitting loosely thereto. A wheel, *n*, fixed in a stationary arm, *o*, disposed beneath the mold-wheel, serves to force upward the follower while it may be passing across such wheel, the upward movement of the follower operating to expel a brick from the mold. In advance of the pug-mill is the main cut-off P, such as used in various other brick-machines, its object being to cut off the clay in the mold even with the top thereof. It has been found that after the mold passes beyond the main cut-off the brick or charge of clay in the mold is liable to and generally will expand more or less, so as to rise above the upper edge of the cap-plate of the mold-wheel. In order to shave off the part of the brick which may so project above the mold-plate is the object of the next part of my invention, which consists of an auxiliary cut-off, *q*, supported in place by a bracket, *r*, extended, as shown, from the main cut-off. The auxiliary cut-off rests on the cap-plate. At its rear the auxiliary cut-off is supported against a pin or stud, *s*, extended down from the bracket. Screws *t t*, going through the bracket, bear upon a metallic plate, *u*, resting upon a spring or block, *v*, of India rubber, which, in turn, is supported on a plate, *w*, resting on the auxiliary cut-off, and shaped, as shown, so as to form directly over the said cut-off a throat or passage, *x*, for discharge of the clay, as it may be removed by the auxiliary cut-off.

From the above it will be seen that the adjustable cut-off is held down upon the cap-plate of the mold-wheel by a spring whose degree of pressure may be increased or diminished by the screws over it. There is extended across the upper end of the pug-mill shaft a horizontal bar, I, arranged to slide vertically upon stationary upright guides K K. From the frame of the machine two rods, L L, are extended upward through the said bar I, and at their upper ends have screws and nuts, as shown at *y y*, the same serving to set down the shaft of the pug-mill from time to time as its lower wings may become worn. In order to properly support the mold-wheel while a mold of it may be receiving clay, and to protect the step and pivot of the shaft of the mold-wheel from pressure resulting from forcing the clay into the mold, I construct the mold-wheel with a circular shoulder or flange, *z*, projecting from and extending around it; and I arrange underneath and against the shoulder or flange an abutment or shelf, *a'*, supported by one or more posts, *b'*, raised on the bed of the frame of the machine, such abutment being disposed as shown.

By my construction of the mold-wheel with Babbitted receiving-chambers and with a slotted steel cap-plate, arranged as described, I am enabled to readily repair the molds as they may become worn, as I have only to remove the Babbitting and melt it and recast it into the chamber, and about a suitable former whose horizontal section shall correspond with that of the brick to be made. Thus I save the making of the mold of plates of steel or hard metal in the way heretofore practiced, which is very expensive, and also renders it expensive to keep the mold in order. By my mode of supporting the follower of the mold it is enabled to accommodate itself to the mold while rising in it, and thus will operate with less friction than would be the case were it not vibratory.

What I claim in the said brick-machine as my invention may be stated as follows, viz:

1. The pug-mill shaft-adjusting mechanism, viz., the screw-rods L L, nuts, and cross-bar I, combined and arranged with the pug-mill and the supporting-frame thereof, as set forth.

2. The mold-wheel, as provided with the Babbitted receiving-chambers *h* and steel cap-plate G arranged with it, as set forth.

3. The auxiliary "cut-off" *q* and its discharging-throat *x* arranged and combined with the main cut-off *p*, the rotary mold-wheel A, and the pug-mill F, all being substantially as described.

4. The presser-spring *v* and adjusting-screws *t* arranged and combined with the main and auxiliary cut-offs, substantially as set forth.

5. The brick-discharger H pivoted at its lower parts to a bar or carrier, *g'*, arranged to slide in vertical slots or guides *h' h'*, whereby the follower is allowed to vibrate more or less to accommodate it to the mold while rising or falling therein.

6. The follower H made with the packing-plate *k*, of anti-friction or Babbitt metal, and the cap-plate *l* arranged and combined with it, as described.

7. The combination of the abutment with the mold-wheel provided with the flange or shoulder, all being essentially as and for the purpose as explained.

ROBERT A. SMITH.

Witnesses:
R. H. EDDY,
S. N. PIPER.